United States Patent
Brown (10) Patent No.: US 6,936,213 B1
(45) Date of Patent: Aug. 30, 2005

(54) ADJUSTMENT OF RELATIVE POSITIONS OF MACHINE COMPONENTS

(75) Inventor: Paul Philip Brown, Ramona, CA (US)

(73) Assignee: Sorensen Research and Development Trust, San Diego, CA (US)

( * ) Notice: Subject to any disclaimer, the term of this patent is extended or adjusted under 35 U.S.C. 154(b) by 0 days.

(21) Appl. No.: 10/715,618

(22) Filed: Nov. 18, 2003

(51) Int. Cl.[7] .............................................. B29C 45/37
(52) U.S. Cl. ............................. 264/328.1; 264/328.7; 425/150; 425/577
(58) Field of Search ........................... 264/40.5, 328.7, 264/328.1; 425/150, 542, 577

(56) References Cited

U.S. PATENT DOCUMENTS

| | | | |
|---|---|---|---|
| 4,332,545 A * | 6/1982 | Cargile ........................ | 425/577 |
| 4,571,171 A * | 2/1986 | Blank et al. ................. | 425/577 |
| 5,034,170 A * | 7/1991 | Briggs et al. ............... | 264/40.5 |
| 5,409,656 A * | 4/1995 | Naruse et al. .............. | 264/275 |
| 6,277,308 B1 * | 8/2001 | Kiernicki et al. ......... | 264/328.7 |
| 6,558,147 B1 * | 5/2003 | Tatsuta et al. ............. | 425/577 |
| 2003/0132551 A1 | 7/2003 | Brown et al. | |

FOREIGN PATENT DOCUMENTS

DK  117387  9/1970

* cited by examiner

Primary Examiner—Jill L. Heitbrink
(74) Attorney, Agent, or Firm—Edward W. Callan (57) ABSTRACT

Apparatus for adjusting relative positions of different machine components includes first and second eccentric rings. The first eccentric ring has a first edge disposed in slideable contact with a first component of a given machine, such as an adjustable base section of a cavity mold part. The second eccentric ring has a first edge disposed in slideable contact with a second component of the given machine, such as a stationary side section of the cavity mold part, and has a second edge disposed in slideable contact with a second edge of the first eccentric ring. The contact portions of each said edge are circumscribed by a respective circle. By rotating both eccentric rings the relative positions of the first and second machine components can be adjusted in accordance with desired two-dimensional coordinates.

12 Claims, 7 Drawing Sheets

ADJUSTMENT OF RELATIVE POSITIONS OF MACHINE COMPONENTS

BACKGROUND OF THE INVENTION

The present invention generally pertains to adjustment of the relative positions of different machine components and is particularly directed to adjusting the relative positions of different sections of a mold part, such as a mold part that is included in a mold for manufacturing a hollow product.

SUMMARY OF THE INVENTION

The present invention provides apparatus for adjusting an alignment between different outer-wall-defining sections of a cavity mold part of a mold in which a hollow product is formed in a mold cavity defined between the cavity mold part and a core mold part, comprising: a first eccentric ring having a first edge disposed in slideable contact with a side section of the cavity mold part that forms an outer surface of a sidewall portion of the hollow product; a second eccentric ring having a first edge disposed in slideable contact with a base section of the cavity mold part that forms an outer surface of a base portion of the hollow product, and having a second edge disposed in slideable contact with a second edge of the first eccentric ring; wherein the contact portions of each said edge are circumscribed by a respective circle; means for rotating the first eccentric ring to thereby adjust the relative positions of the first and second components and thereby adjust an alignment between the side and base sections of the cavity mold part; and means for rotating the second eccentric ring to thereby adjust the relative positions of the first and second components and thereby adjust the alignment between the side and base sections of the cavity mold part.

Each of the first and second eccentric rings may be included in a machine component other than the machine component with which the first edge is disposed in slideable contact.

Each eccentric ring is eccentric in that the center of the circle that circumscribes the contact points of the edge that is disposed in slideable contact with the other eccentric ring is displaced from the center of the circle that circumscribes the contact points of the edge that is disposed in slideable contact with the respective machine component.

When the one eccentric ring is rotated the other eccentric ring is pushed in a nonlinear direction because of the eccentricity of the ring that is rotated; whereby by rotating both eccentric rings the relative positions of the first and second machine components can be adjusted in accordance with desired two-dimensional coordinates. The two eccentric rings may be rotated either simultaneously or one after the other; and in the latter case, the order in which the two eccentric rings are rotated is arbitrary.

The present invention further provides a method of manufacturing a hollow product that is formed in a mold cavity defined between a cavity mold part and a core mold part, wherein a first machine component includes a side section of the cavity mold part that forms an outer surface of a sidewall portion of the hollow product and a second machine component includes a base section of the cavity mold part that forms an outer surface of a base portion of the hollow product; the method comprising the steps of:

(a) providing said first and second machine components that are combined for manufacture of the product;

(b) adjusting the position of the first machine component relative to the position of the second machine component; and (c) commencing manufacture of the product with the first machine component in said adjusted position;

wherein step (a) comprises the steps of (d) combining the first machine component with a first eccentric ring having a first edge disposed in slideable contact with said first component;

(e) combining the second machine component with a second eccentric ring having a first edge disposed in slideable contact with said second component; and (f) disposing a second edge of the second eccentric ring in slideable contact with a second edge of the first eccentric ring;

wherein the contact portions of each said edge are circumscribed by a respective circle; and wherein step (b) comprises the step of:

(g) rotating the first eccentric ring to thereby adjust the relative positions of the first and second components; and (h) rotating the second eccentric ring to thereby adjust the relative positions of the first and second components; and wherein step (b) comprises the step of:

(i) adjusting an alignment between side and base sections of the cavity mold part.

Additional features of the present invention are described with reference to the detailed description of the preferred embodiments.

DETAILED DESCRIPTION

Figure 1:
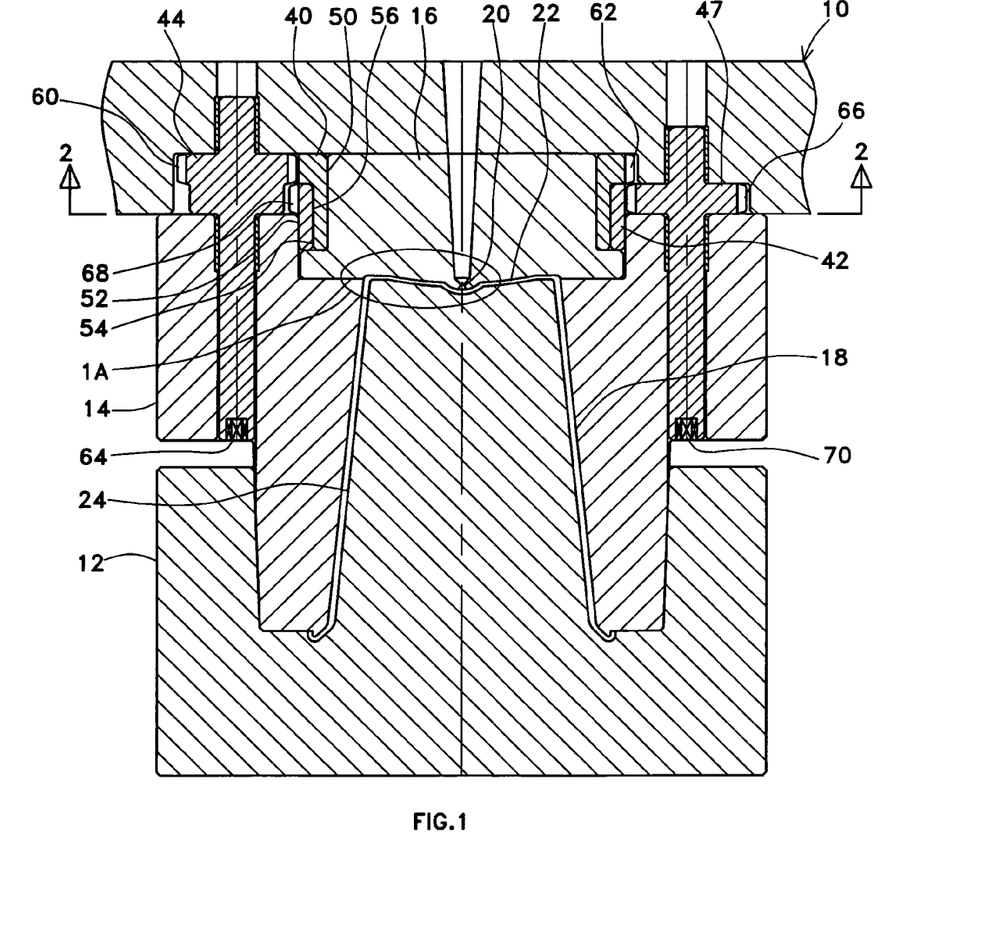
FIG. 1 is a sectional view of a mold in combination with a preferred embodiment of the apparatus of the present invention, taken along line 1—1 in FIG. 2.
Figure 1A:
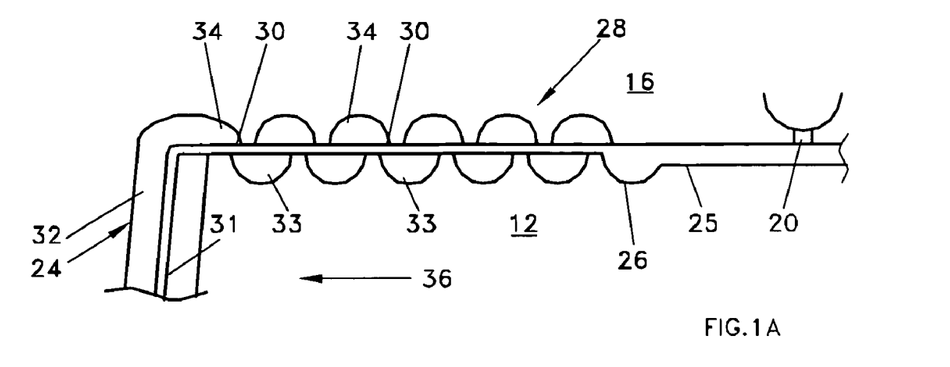
FIG. 1A is an enlarged view of an inscribed portion 1A of a mold cavity shown in FIG. 1, with said enlarged view illustrating the sectional aspect of a sequence of variable-opening throttles in a base-wall section flow guide.
Figure 2:
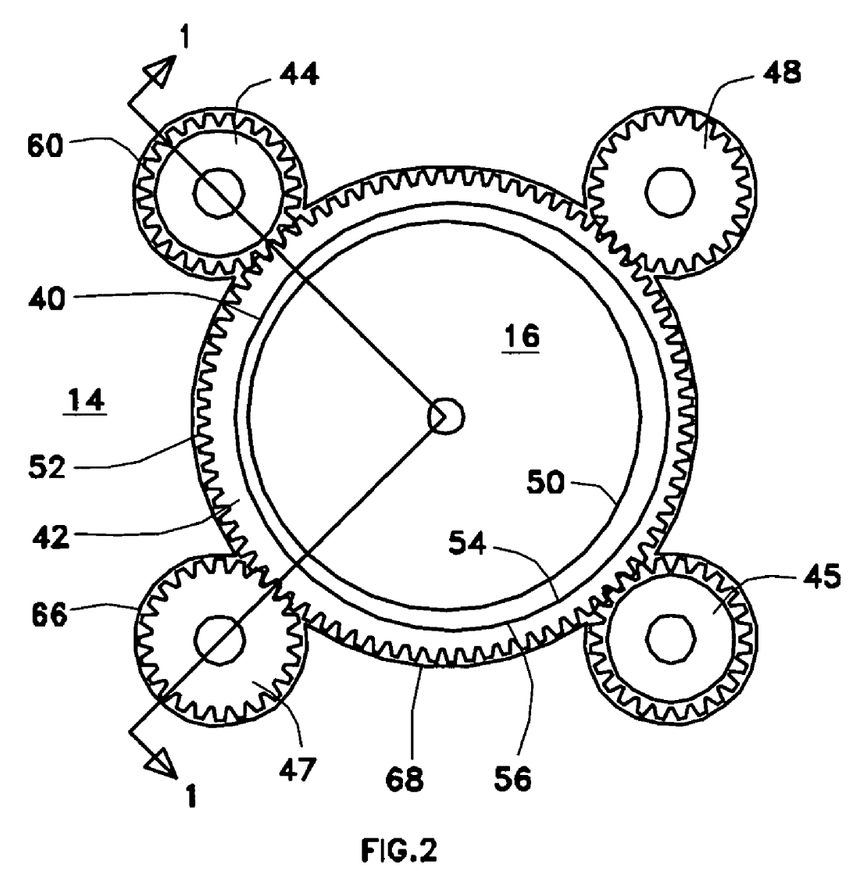
FIG. 2 is an end view of the combination of the mold and the apparatus shown in FIG. 1, taken along line 2—2 in FIG. 1, with said end view illustrating the disposition of means for rotating two sets of eccentric rings.

Referring to FIGS. 1, 1A and 2, a preferred embodiment of the apparatus of the present invention is combined with a mold 10 that is used to manufacture a hollow product. A preferred embodiment of the mold 10 includes a core mold part 12, a cavity mold part that includes a stationary side section 14 and an adjustable base section 16 for defining a mold cavity 18 for forming a hollow symmetrical thin-wall plastic product, such as a drink cup. The stationary side section 14 of the cavity mold part forms an outer surface of a sidewall portion of the hollow product and the adjustable base section 16 of the cavity mold part forms an outer surface of a base portion of the hollow product.

The mold further includes a gate 20 from which fluid plastic material can be injected into a base-wall section 22 of the mold cavity 18 when the adjustable base section 16 and the core mold part 12 are combined in an aligned opposition to one another. The mold cavity 18 includes the base-wall section 22 and a sidewall section 24.

Referring to FIG. 1A, the base-wall section includes an inlet section 25 adjacent the gate 20, an inner circular flow guide 26 encircling the inlet section 25 and a plurality of radial flow guides 28 for conducting the injected plastic material from the inner circular flow guide 26, through the base-wall section 22 and thence into the sidewall section 24. Each of the base-wall-section flow guides 28 includes a sequence of variable-opening throttles 30 through which the injected plastic material is conducted to the sidewall section 24. The sidewall section 24 includes a plurality of thin-wall sectors 31 and a plurality of flow guides 32 respectively extending from the plurality of throttled base-wall-section flow guides 28 for directing the flow of some of the injected plastic material to the thin-wall sectors 31 of the sidewall-section 24.

The throttles 30 are shaped by partially opposed recesses 33, 34 in the respective combined core mold part 12 and adjustable base section 16, with the opposed recesses 33, 34 being so staggered along the direction of conduction 36 within a given individual base-wall-section flow guide 28 that whenever the alignment between the combined core mold part 12 and the adjustable base section 16 varies along the direction of conduction 36 for the given flow guide 28 the openings of the throttles 30 in the given flow guide 28 vary. The recesses 33, 34 are circular in the approximate broad dimension of the base-wall section. The portion of the mold 10 described with reference to FIG. 1A is further described in U.S. Patent Application Publication No. U.S. 2003-0132551, the disclosure of which is incorporated herein by reference thereto.

The apparatus of the present invention is combined with the mold 10 for adjusting an alignment between the stationary side section 14 of the cavity mold part and the adjustable base section 16.

The preferred embodiment of the apparatus of the present invention includes a first eccentric ring 40, a second eccentric ring 42, and two pairs of oppositely disposed drive gears 44, 45 and 47, 48 for respectively rotating the first and second eccentric rings 40, 42. The first pair of drive gears 44, 45 is displaced from the second pair of drive gears 47, 48 by a given angle, which is ninety degrees in the preferred embodiment. In an alternative embodiment (not shown), only one drive gear is used for rotating the first eccentric ring 40 and only one drive gear is used for rotating the second eccentric ring 42.

The first eccentric ring 40 is so combined with the adjustable base section 16 of the cavity mold part that the innermost edge 50 of the first eccentric ring is disposed in slideable contact with the adjustable base section 16. The second eccentric ring 42 is so combined with the stationary side section 14 of the cavity mold part that the outermost edge 52 of the second eccentric ring 42 is disposed in slideable contact with the stationary side section 14. In addition, the innermost edge 54 of the second eccentric ring 42 is disposed in slideable contact with the outermost edge 56 of the first eccentric ring 40.

The contact portions of each of the edges 50, 52, 54, 56 are circumscribed by a respective circle. However, it is not required that any of these edges 50, 52, 54, 56 actually is circular.

The drive gear 44 includes teeth 60 for engaging gear teeth 62 on first eccentric ring 40 and thereby rotate the first eccentric ring 40 when the drive gear 44 is rotated. The drive gear 44 includes an exposed axial recess 64 into which a tool, such as an Allan key (not shown) may be inserted for rotating the drive gear 44. A like-constructed drive gear 45 is disposed on the opposite side of the first eccentric ring 40 for likewise engaging the gear teeth 62 on the first eccentric ring 40. Like-constructed drive gears 47–48 having gear teeth 66 are disposed on opposite sides of the second eccentric ring 42 for likewise engaging gear teeth 68 on the second eccentric ring 42 so that the second eccentric ring 42 can be rotated when tools are inserted into respective exposed axial recesses 70 in the drive gears 47, 48 and turned to rotate the drive gears 47, 48.

Figure 3A:
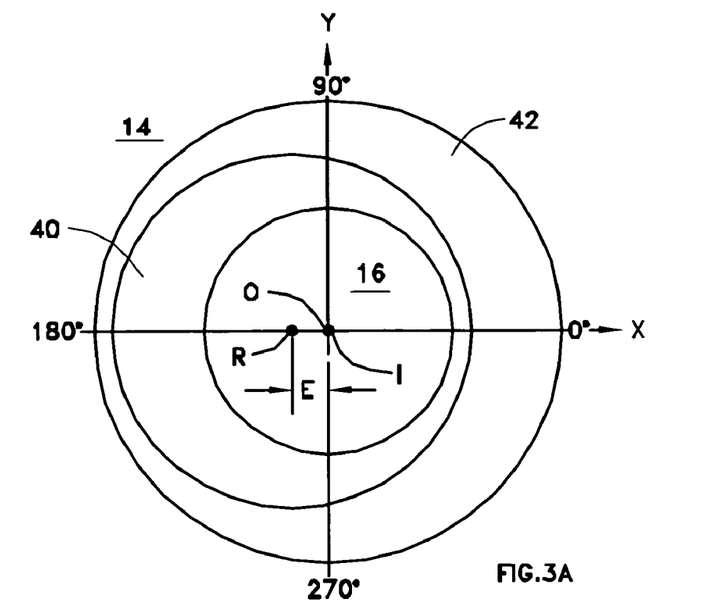
FIGS. 3A and 3B illustrate an exemplary embodiment of relative rotation of two eccentric rings according to the present invention.
Figure 3B:
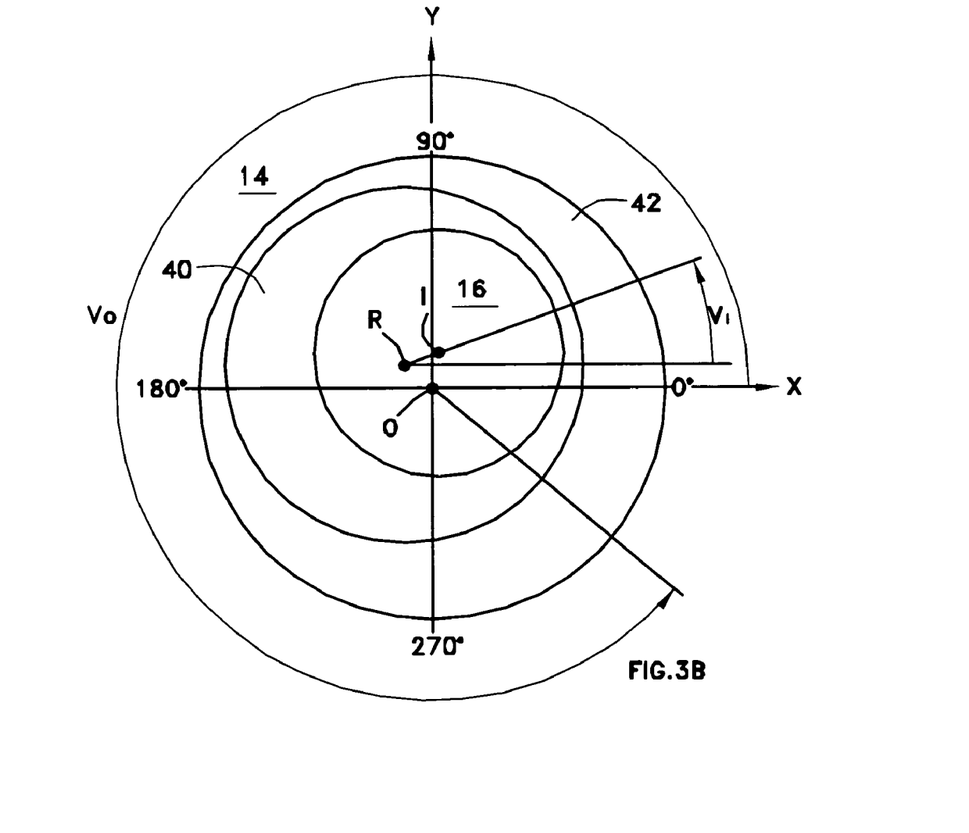

FIGS. 3A and 3B illustrate the effect of rotating both of the eccentric rings 40, 42 with respect to each other. Point R is center of the circular interface between the two eccentric rings 40, 42. Point I is center of the circular interface between the first (inner) eccentric ring 40 and the movable mold part 16. Point 0 is center of the circular interface between the second (outer) eccentric ring 42 and the stationary mold part 14. Since the mold part 14 is stationary, point O remains stationary. Accordingly, the x-and-y axes are shown as intersecting at point O. The two-dimensional coordinate position of the point O(x,y)=(0,0). E is the initial displacement along the x-axis of point R from point O for the configuration shown in FIG. 3A.

Referring to FIG. 3B, the inner ring 40 is rotated counterclockwise through an angle $V_I$ in relation to the position of the inner ring 40 shown in FIG. 3A; and the outer ring 42 is rotated clockwise through an angle $V_O$ in relation to the position of the outer ring 42 shown in FIG. 3A. The two-dimensional x-y coordinate position of point I in relation to point O following such rotation of both eccentric rings 40, 42 is expressed by the following equation:

$$I(x,y) = \{[E^*\cos(V_I) - E^*\cos(V_O)], \quad [E^*\sin(V_I) - E^*\sin(V_O)]\} \qquad \text{Eq. 1}$$

Figure 4:
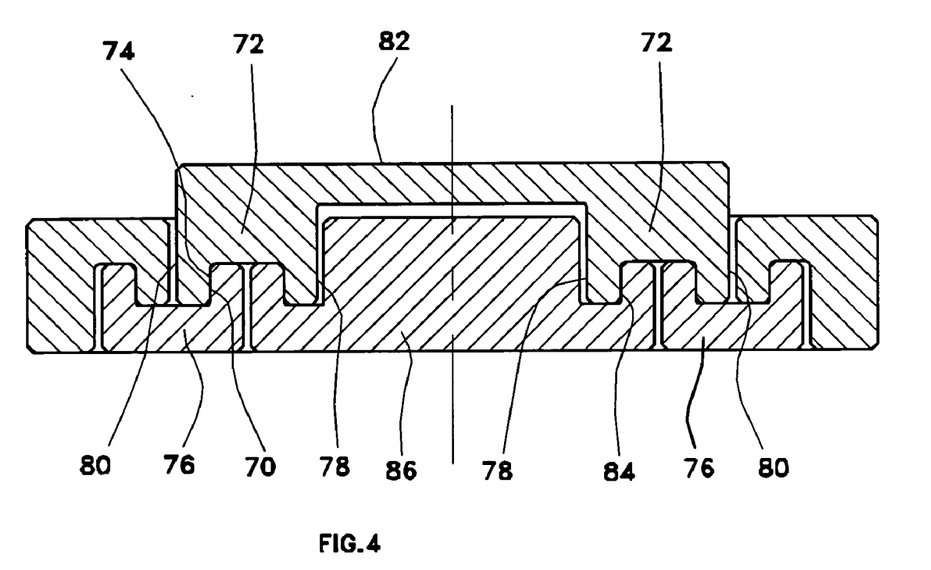
FIG. 4 is a sectional view of a portion of an exemplary alternative embodiment of the apparatus of the present invention in which the eccentric rings are shown in contact with each other and in contact with stationary and movable mold parts.

In alternative embodiments the edge of one eccentric ring that is disposed in slideable engagement with an edge of the other eccentric ring may be an edge other than either the innermost edge or the outermost edge of the one eccentric ring. One such alternative embodiment is shown in FIG. 4, wherein an inner edge 70 of an eccentric ring 72 is disposed in slideable engagement with an inner edge 74 of another eccentric ring 76. The one ring 72 extends from a disc 82 and is integral therewith in a common part.

In the same or other alternative embodiments the edge of an eccentric ring that is disposed in slideable contact with a machine component may be an edge other than either the innermost edge or the outermost edge of such eccentric ring. Such an alternative embodiment also is shown in FIG. 4, wherein the edge 84 of the eccentric ring 72 that is disposed in slideable contact with a machine component 86 is an edge other than either the innermost edge 78 or the outermost edge 80 of the eccentric ring 72.

Figure 5:
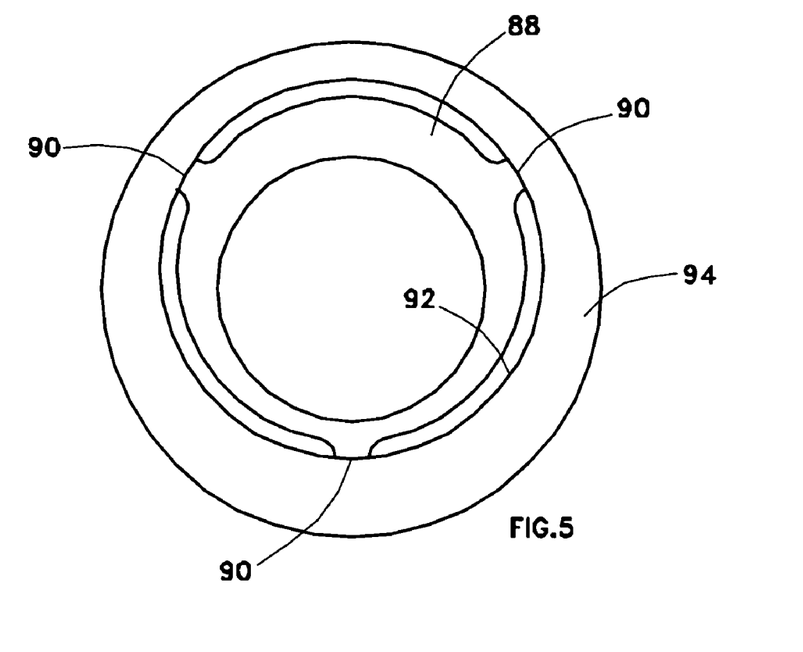
FIG. 5 illustrates an exemplary combination of a pair of eccentric rings in an alternative embodiment of the apparatus of the present invention in which the contacting edge of one of the eccentric rings is so contoured that the contact between the respective contacting edges of the eccentric rings is not continuous.
Figure 6:
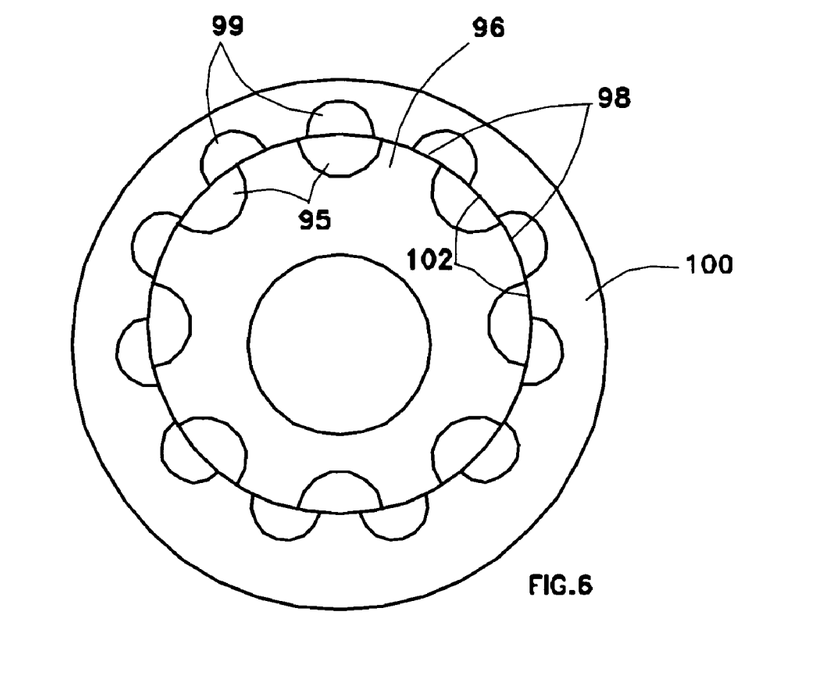
FIG. 6 illustrates an exemplary combination of a pair of eccentric rings in an alternative embodiment of the apparatus of the present invention in which the respective contacting edges of both eccentric rings are so contoured that the contact between such contacting edges is not continuous.
Figure 7:
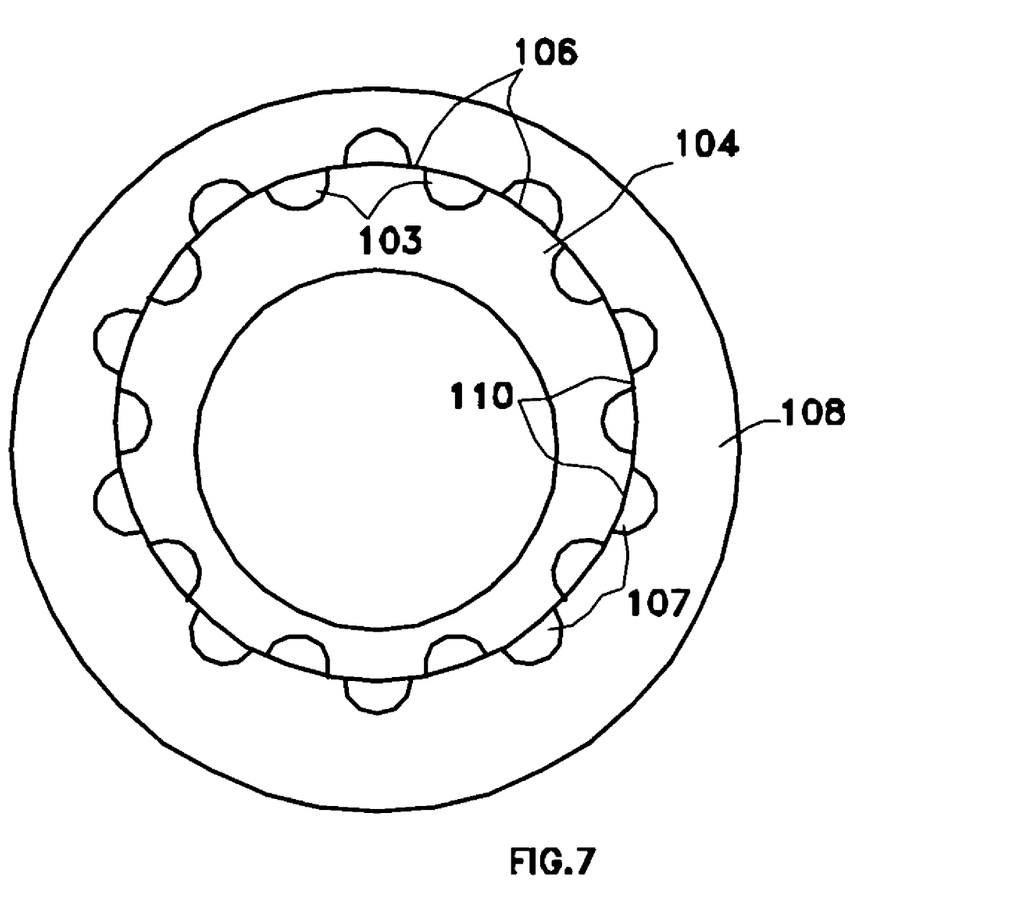
FIG. 7 illustrates another exemplary combination of a pair of eccentric rings in an alternative embodiment of the apparatus of the present invention in which the respective contacting edges of both eccentric rings are so contoured that the contact between such contacting edges is not continuous.

Referring to FIGS. 5, 6 and 7, the edges of the eccentric rings that contact one another may have any variety of combined contours, provided that each edge has at least three contact points that are not all within one-hundred-eighty degrees of one another, and further provided that the at least three contact points of each edge are in contact with at least three contact points of the other edge at any one time. The at least three contact points of one edge that are in contact with at least three contact points of the other edge do not have to be the same three contact points at all times.

In FIG. 5, the outermost edge of an inner eccentric ring 88 has only three contact points 90 disposed in slideable contact with a circular innermost edge 92 of an outer eccentric ring 94. The circular innermost edge 92 has a continuum of contact points.

In FIG. 6, there are a first number of breaks 95 in an otherwise circular outermost edge of an inner eccentric ring 96 to thereby define a corresponding first number of contact points 98 and a second different number of breaks 99 in an otherwise circular innermost edge of an outer eccentric ring 100 to thereby define a corresponding second number of contact points 102, with the contact points 98 being disposed at different intervals than the contact points 102.

In FIG. 7, there are a given number of breaks 103 in an otherwise circular outermost edge of an inner eccentric ring 104 to thereby define a corresponding given number of contact points 106 and the same given number of breaks 107 in an otherwise circular innermost edge of an outer eccentric ring 108 to thereby define a corresponding given number of contact points 110, with the contact points 106 being disposed at the same intervals as the contact points 110. The extent of the intervals between adjacent contact points 106, 110 is less than the curvilinear extent of the contact points 106, 110 so that the contact points 106 are continuously in contact with the contact points 110 as the concentric rings 104, 108 are rotated.

In alternative embodiments (not shown), the means for rotating the concentric rings may be motorized, and preferably remotely controlled; and/or a viewable indication of the relative positions of the concentric rings is provided by use of means such as a rotary encoder.

The benefits specifically stated herein do not necessarily apply to every conceivable embodiment of the present invention. Further, such stated benefits of the present invention are only examples and should not be construed as the only benefits of the present invention.

While the above description contains many specificities, these specificities are not to be construed as limitations on the scope of the present invention, but rather as examples of the preferred embodiments described herein. Other variations are possible and the scope of the present invention should be determined not by the embodiments described herein but rather by the claims and their legal equivalents. The claims require no implicit limitations. Each claim is to be construed explicitly as stated, or by its legal equivalent.

Regarding the method claims, except for those steps that can only occur in the sequence in which they are recited, and except for those steps for which the occurrence of a given sequence is specifically recited or must be inferred, the steps of the method claims do not have to occur in the sequence in which they are recited.

What is claimed is:

1. A method of manufacturing a hollow product that is formed in a mold cavity defined between a cavity mold part and a core mold part, wherein a first machine component includes a side section of the cavity mold part that forms an outer surface of a sidewall portion of the hollow product and a second machine component includes a base section of the cavity mold part that forms an outer surface of a base portion of the hollow product; the method comprising the steps of:
   (a) providing said first and second machine components that are combined for manufacture of the product;
   (b) adjusting the position of the first machine component relative to the position of the second machine component; and
   (c) commencing manufacture of the product with the first machine component in said adjusted position;
   wherein step (a) comprises the steps of
   (d) combining the first machine component with a first eccentric ring having a first edge disposed in slideable contact with said first component;
   (e) combining the second machine component with a second eccentric ring having a first edge disposed in slideable contact with said second component; and
   (f) disposing a second edge of the second eccentric ring in slideable contact with a second edge of the first eccentric ring;
   wherein the contact portions of each said edge are circumscribed by a respective circle; and
   wherein step (b) comprises the step of:
   (g) rotating the first eccentric ring to thereby adjust the relative positions of the first and second components; and
   (h) rotating the second eccentric ring to thereby adjust the relative positions of the first and second components; and
   wherein step (b) comprises the step of:
   (i) adjusting an alignment between side and base sections of the cavity mold part.

2. A method according to claim 1, wherein step (i) comprises the step of:
   (j) adjusting a plurality of throttles that are respectively shaped by relative positions of partially opposed recesses respectively disposed in the core mold part and the base section of the cavity mold part.

3. A method according to claim 1, wherein steps (g) and (h) comprise the step of:
   (j) rotating the respective eccentric rings about parallel axes of rotation to adjust the relative positions of the first and second components within a plane that is perpendicular to said axes of rotation.

4. A method according to claim 1, wherein the second edge of the second eccentric ring is disposed in slideable contact with the outermost edge of the first eccentric ring.

5. A method according to claim 4, wherein the second edge of the second eccentric ring is the innermost edge of the second eccentric ring.

6. A method according to claim 1, wherein the second edge of the first eccentric ring is disposed in slideable contact with the innermost edge of the second eccentric ring.

7. Apparatus for adjusting an alignment between different outer-wall-defining sections of a cavity mold part of a mold in which a hollow product is formed in a mold cavity defined between the cavity mold part and a core mold part, comprising:

a first eccentric ring having a first edge disposed in slideable contact with a side section of the cavity mold part that forms an outer surface of a sidewall portion of the hollow product;

a second eccentric ring having a first edge disposed in slideable contact with a base section of the cavity mold part that forms an outer surface of a base portion of the hollow product, and having a second edge disposed in slideable contact with a second edge of the first eccentric ring;

wherein the contact portions of each said edge are circumscribed by a respective circle;

means for rotating the first eccentric ring to thereby adjust the relative positions of the first and second components and thereby adjust an alignment between the side and base sections of the cavity mold part; and means for rotating the second eccentric ring to thereby adjust the relative positions of the first and second components and thereby adjust the alignment between the side and base sections of the cavity mold part.

8. Apparatus according to claim 7, for adjusting a plurality of throttles that are respectively shaped by relative positions of partially opposed recesses respectively disposed in the core mold part and the base section of the cavity mold part.

9. Apparatus according to claim 7, wherein the second edge of the second eccentric ring is disposed in slideable contact with the outermost edge of the first eccentric ring.

10. Apparatus according to claim 9, wherein the second edge of the second eccentric ring is the innermost edge of the second eccentric ring.

11. Apparatus according to claim 7, wherein the second edge of the first eccentric ring is disposed in slideable contact with the innermost edge of the second eccentric ring.

12. Apparatus according to claim 7, wherein each rotating means includes a pair of oppositely disposed drive gears for rotating the respective eccentric ring.

* * * * *